Feb. 7, 1967   W. C. COOPER   3,302,768
ARTICLE INVERTING APPARATUS
Filed Oct. 21, 1965   4 Sheets-Sheet 1

INVENTOR.
William C. Cooper
BY
William R. Nolte
AGENT

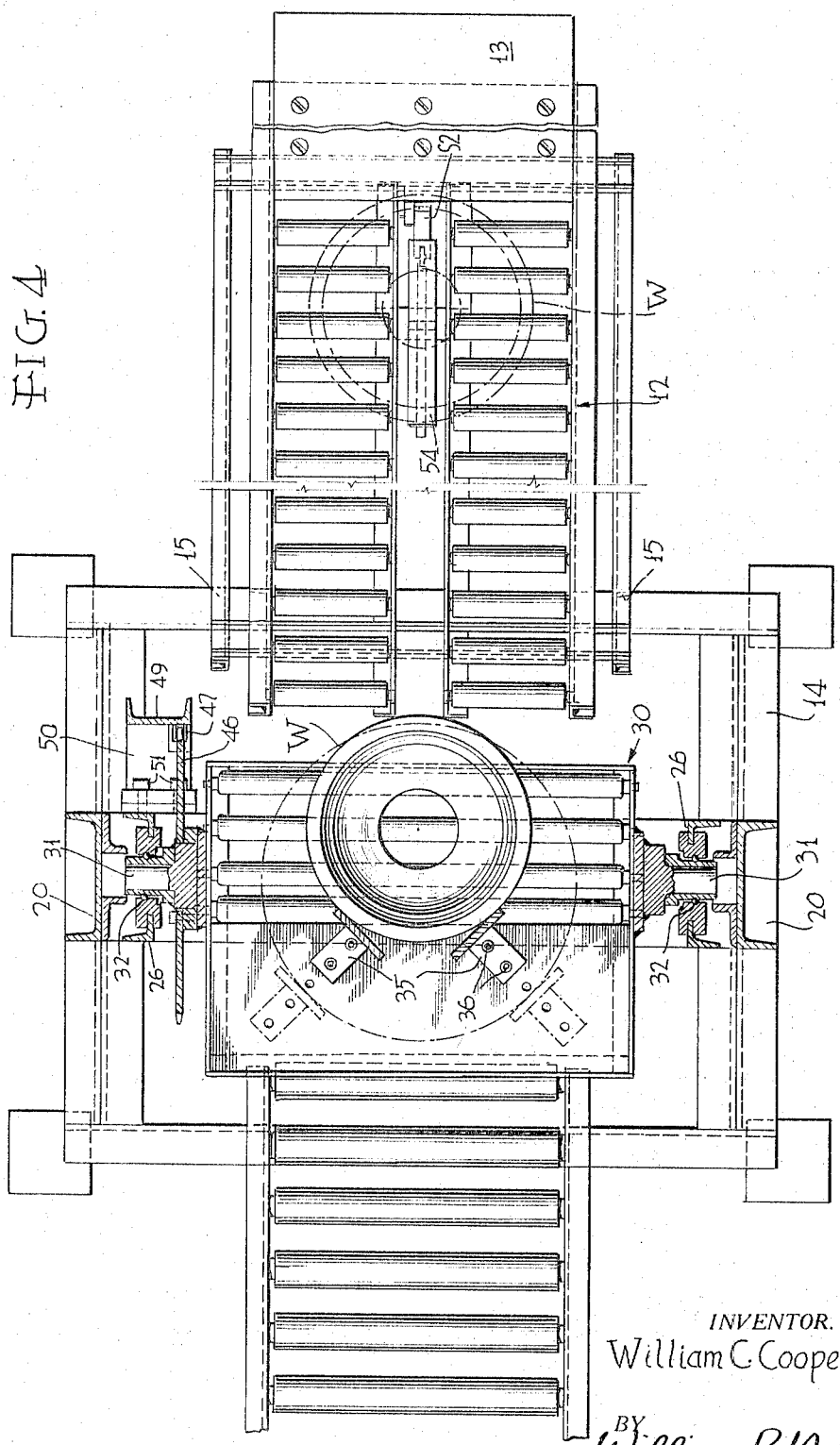

United States Patent Office 3,302,768
Patented Feb. 7, 1967

3,302,768
ARTICLE INVERTING APPARATUS
William C. Cooper, Royal Oak, Mich., assignor to The Budd Company, Philadelphia, Pa., a corporation of Pennsylvania
Filed Oct. 21, 1965, Ser. No. 499,530
7 Claims. (Cl. 198—33)

This invention relates to article inverting apparatus, especially for inverting cupped wheel disks and changing their position by translation, and has for an object the provision of improvements in this art.

At certain stages in the manufacture of cupped automobile disks, after certain operations have been performed on them, it becomes necessary or desirable to invert them for subsequent operations; and, in the case to be considered herein, it is also necessary to change the elevation of the articles in an assembly or work line as well as to invert them.

It is, therefore, one of the particular objects of the invention to provide improved means which will automatically take one article or workpiece at a time, hold the following articles, invert the article, and feed it out to receiving means in inverted position.

Another object is to provide inverting or turnover apparatus having an article container operating between fixed conveyor means on opposite sides which provides adjustable holding means for articles of different diameters and depths.

Another object is to provide control means which operates in response to the entry of an article into the container to initiate the turnover cycle and which includes other control means to prevent the initiation of the turnover cycle if the delivery or offtake position or station is not clear of delivered articles from the turnover-elevator means.

Another object is to provide means of a movable turnover device for operating a fixed control device and providing adjustment for articles of different diameters to actuate common means for operating the control device.

Another object is to provide turnover and elevator means which cooperates with the operator of a control device to position a part to operate the control device by reciprocatory movement and which clears the interacting parts from each other by rotational movement.

Another object is to provide article dispensing means which is actuated by the translatory and rotational movement of the article container to feed an article into the container when it reaches the article-receiving position and which is cleared so it will hold back the next succeeding article by the translatory and rotational movement of the container.

The above and other objects of the invention, as well as novel features and advantages, will be apparent from the following description of an exemplary embodiment thereof, reference being made to the accompanying drawings, wherein:

FIG. 4 is a horizontal section taken on the line 4—4 of FIG. 1.

Figure 1:
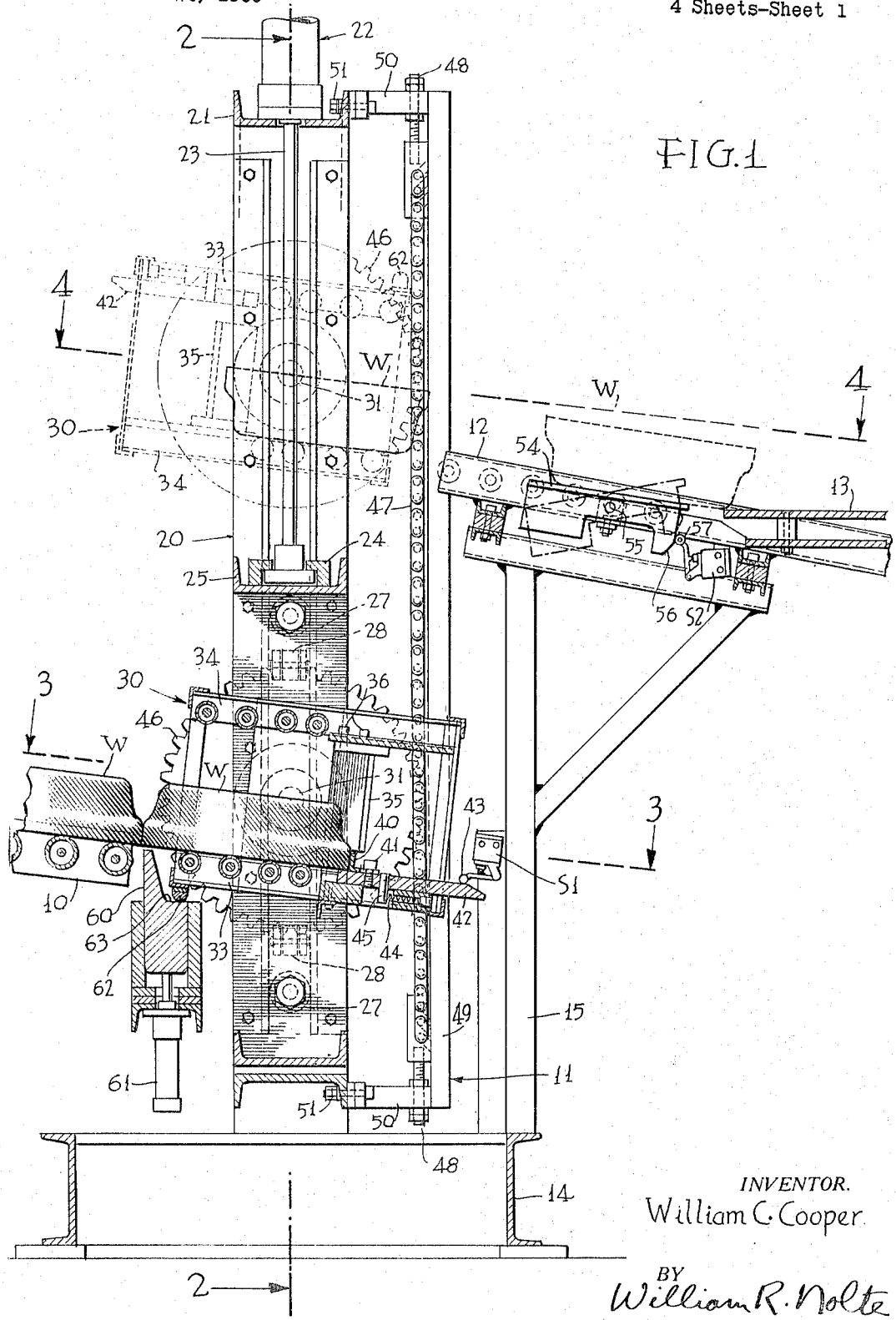
FIG. 1 is a vertical longitudinal section of a turnover-elevator device embodying the invention.

Herein the direction of movement of articles will be considered to be the longitudinal direction.

A supply conveyor 10 of the gravity roller type is shown as feeding down a line of articles or workpieces W to a turnover-elevator device 11 which delivers them to an off-take conveyor 12 of the gravity roller type and from that to a receiving device 13, here shown as a table but which may be another conveyor which will carry off a line of articles. A base frame 14 supports the apparatus herein considered and a side frame 15 supports the take-off conveyor 12.

The turnover elevator device 11 comprises upright elevator guides 20 which are supported on the base 14, the upright guides being connected at the top by a cross beam 21 which carries a power device 22 for operating the turnover elevator.

The power device herein shown is of the reciprocatory fluid-actuated cylinder-piston type having a piston rod 23 secured by a connection 24 to the top bar 25 of a vertically movable elevator cage 26. Rollers 27 guide the cage in a longitudinal direction and rollers 28 guide it in a transverse direction. The guide means for the guide rollers is obvious without description. Suitable means, not shown, is provided for stopping the cage in proper top and bottom positions.

An article container 30 is turnably mounted on the cage, as by stub shafts or axles 31 turnable in bearings 32 carried by the cage. The container is open at the article-receiving end and closed at the other end. Both the bottom side 33 and the top side 34 of the container are provided with conveyor rollers for easy movement of an article into and out of the container.

Adjustable stops 35 secured by set screws 36 to the top side 34 of the container provide accommodation for articles of different diameters in the container. An article of the smallest size is shown in solid lines in the drawings. The stops 35 are arranged to move on radial lines symmetrically arranged about a longitudinal center line of the container so as to position the forward edge of an article on the longitudinal center line. This is clearly shown in FIG. 4 where an article of larger size is also shown, appearing in broken lines.

Figure 2:
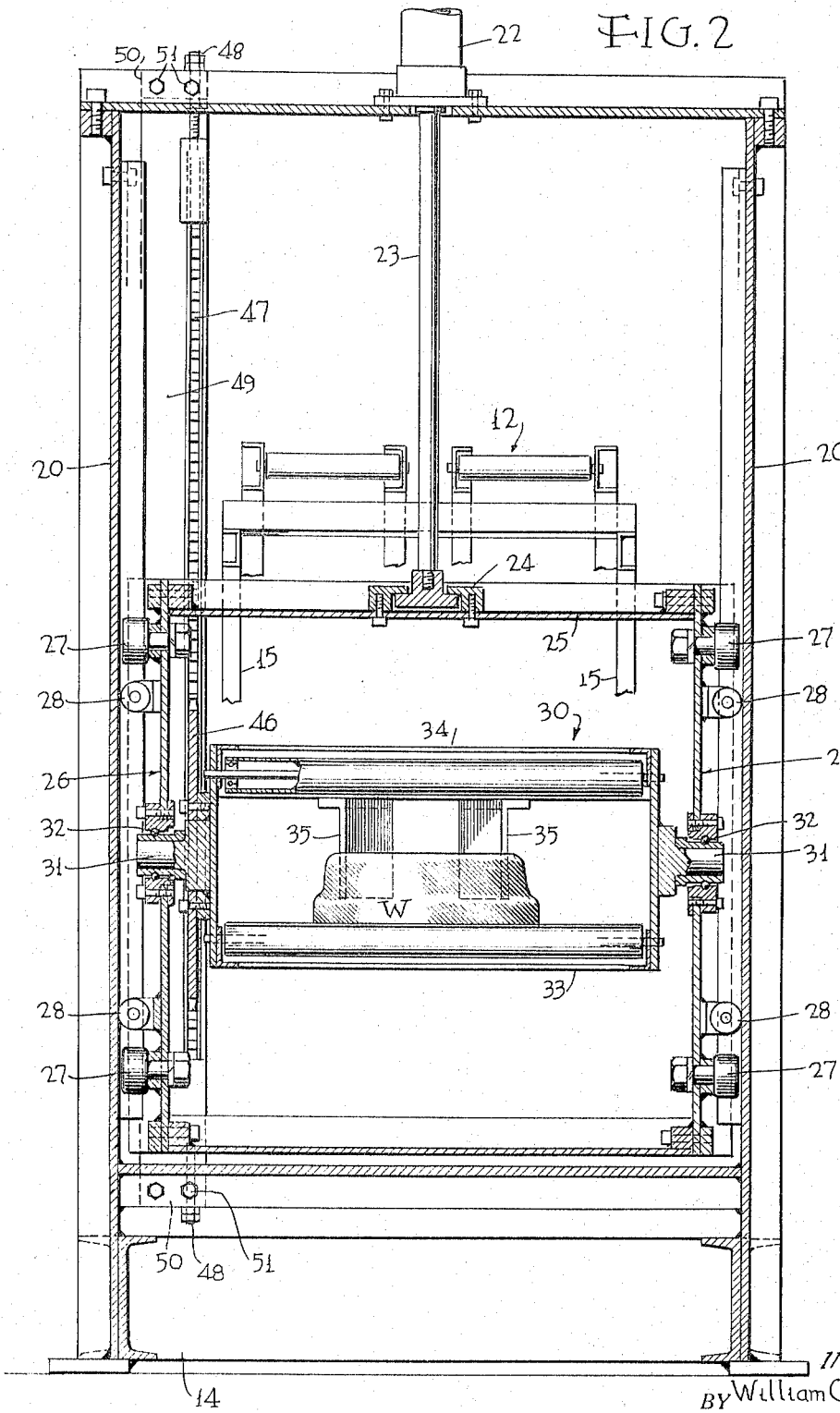
FIG. 2 is a vertical transverse section taken on the line 2—2 of FIG. 1.
Figure 3:
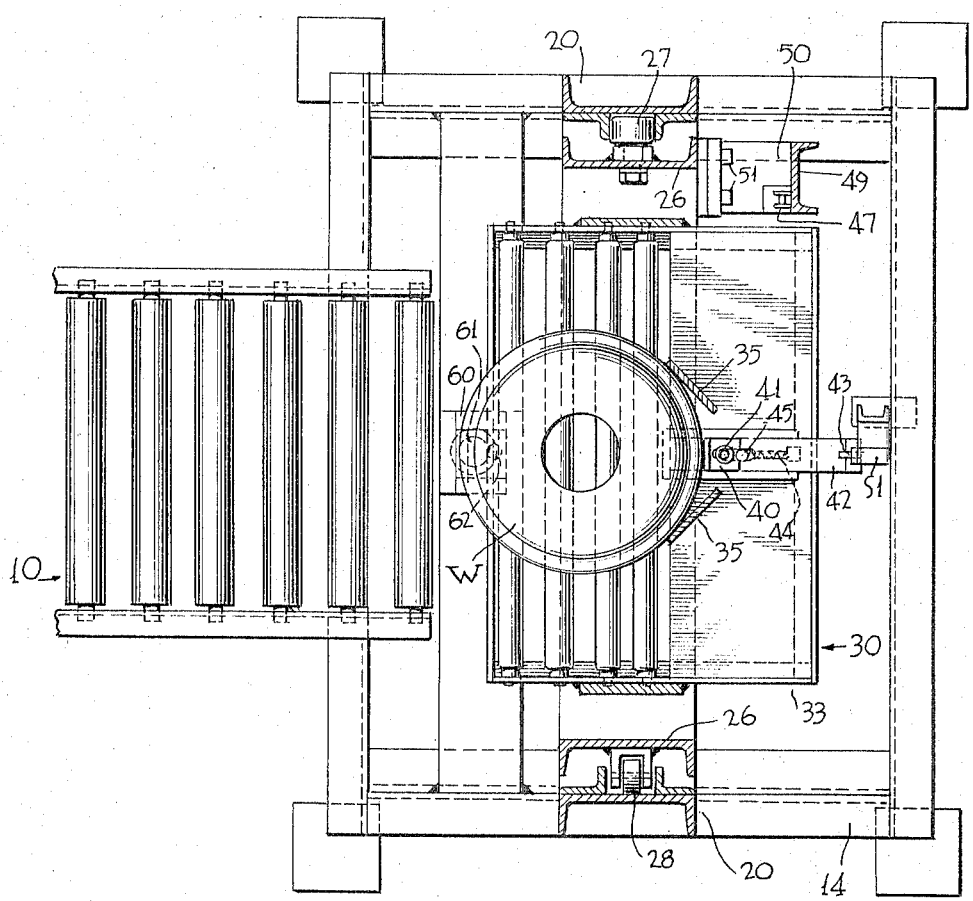
FIG. 3 is a horizontal section taken on the line 3—3 of FIG. 1.

The stops extend for most of the distance between the top and bottom sides but are spaced a distance above the bottom side, as shown in FIGS. 1 and 2. This provides that the stops will guide the articles as they shift from the bottom side to the top side when turned over and also provides space for the upstanding flange of an adjustable control operating member 40 which is engaged by the forward edge of an article when it enters the container and before it engages the stops 35.

The member 40 is secured in adjusted positions, as by one or more set screws 41, to a slide 42 which is mounted in guides on the bottom side of the container and which is tapered at the forward end to operate the arm 43 of a control switch S1. The slide is urged to a position to be engaged by incoming articles, as by a compression spring 44 acting against a depending projection 45 carried by the slide.

Means are provided for inverting the container carrying an article therein, the means shown herein comprising a sprocket gear 46 secured to the container concentric with one of the shafts 31 and geared with a fixed sprocket chain 47 which is secured at its ends, as by bolts 48, to a vertical channel beam 49 which is secured, as by brackets 50 and bolts 51, to frame elements of the upright elevator guides 20. The beam 49 forms a backing member to hold the sprocket chain in engagement with the teeth of sprocket gear 46 in case the tautness of the chain is not adequate for this purpose.

Means are provided for registering the delivery of an article to the offtake conveyor 12 and for preventing the transfer of an article thereto if the previously delivered article has not cleared the delivery position on the offtake conveyor. The means here shown comprises a switch operating plate 54 mounted on pivot means 55 and normally urged upward at its forward end by a spring or by the gravity over-weight of its rear end, as shown, so as to be engaged by a passing article which moves its forward end down to cause a tapered portion 56 to operate the actuator arm 57 of a control switch S2.

The switch S2 may, for example, open a control line through switch S1 to prevent operation until the line of delivered articles has cleared the offtake plate 54; and, if switch S2 is closed, the operation of switch S1 by the entry of an article into the container will initiate operation of the elevator-turnover device to deliver the article to the offtake conveyor. The turning movement of the container clears the operator 42 from the switch arm 43 as the container moves up with the cage. This restores the switch S1 to its initial position but it will be understood that a lock-in relay will keep the circuit energized until the article is delivered and the switch S2 is opened. This will cause a reverse movement of the piston rod and the return of the elevator cage and container to the initial position shown in full lines in FIG. 1.

Means are provided for holding back following articles on the feed-in conveyor 10 when an article is being transferred by the elevator-turnover device. The hold-back, escapement, or dispensing means here shown comprises a plunger 60 which is constantly urged upward, as by a fluid power cylinder-piston device 61, and which is pushed down to release the lowermost article into the container by a projection 62 on the container 30 which engages a shoulder 63 on the plunger when the container is returned to initial position.

The operation of the device will be clear from the foregoing description. When an article W slides down from the supply conveyor 10 into the container 30 it will actuate the switch S1 and if switch S2 is not being held open by an article on the plate 54 the control circuit will be energized to operate the elevator-turnover mechanism to deliver the article in the inverted position upon the offtake conveyor 12. As the container begins to turn and rise it will release the plunger 60 which rises to hold back the next following article and the line of articles behind it. As a delivered article moves down over the plate 54 it will open the switch S2 and de-energize the circuit to cause return movement to initial position, as described. Return of parts to initial position depresses the dispensing plunger 55 and feeds another article into the container, as described.

It will be evident that while the device elevates the container as it is turned to cooperate with an elevated offtake conveyor, the same mechanism will operate without the elevator, it only being necessary to move the sprocket chain 47 up and down by a power device instead of moving the cage and container up and down. The offtake conveyor and appurtenances, of course, would be moved to a lower position as required to receive inverted articles.

It will also be evident that the mechanism disclosed will operate to invert and translate an article horizontally instead of translating it vertically as specifically shown; also that it will operate on a vertically moving line of articles instead of a horizontally moving line as specifically shown; and this with turnover alone or turnover together with translation in line or at an angle to the supply conveyor. These actions can be understood by turning the drawings at an angle and need no illustration. Some alteration of the control switch operating means would be required but could be made by a skilled mechanic as needed by reference to the mechanisms which have been described herein.

It is thus seen that the invention provides relatively simple, inexpensive, and reliable means for inverting the position of an article and for translating it as well as inverting it when required. The apparatus is entirely automatic in its action and requires no supervision except to see that it operates properly and to make adjustments to accommodate articles of different sizes.

While one embodiment of the invention has been described for purposes of illustration, it is to be understood that there may be various embodiments and modifications within the general scope of the invention.

I claim:

1. Article inverting apparatus comprising in combination, an infeed conveyor, an offtake conveyor, an article container, means to vertically move and means to mount said article container on a turning axis between said conveyors, a movement control device mounted adjacent the article-receiving position of said container for controlling actuation of said moving means and control operating means for operating said control device, said control operating means being actuated by an article entering said container when the container is in article receiving position and said control operating means being moved away from control operating position when the container is moved away from article receiving position.

2. Article inverting apparatus as set forth in claim 1, further characterized by the fact that said control operating means is mounted on said container.

3. Article inverting apparatus as set forth in claim 1, further characterized by the fact that said control operating means comprises a slide mounted on said container, and an article-engaged element adjustably secured on said slide to adapt for operation by articles of different sizes on said container.

4. Article inverting apparatus, comprising in combination, an infeed conveyor, an offtake conveyor, an article container, means to vertically move and means to mount said article container on a turning axis between said conveyors to take an article from said infeed conveyor and invert it and feed it out to said offtake conveyor, and control means on said offtake conveyor engageable by an article thereon, and means cooperating with said offtake control means which initiates the return of said container by said moving means to article receiving position when said offtake control means is actuated by an article and which inhibits movement of the container away from article-receiving position so long as an article is in operative position relative to said offtake control means.

5. Article inverting apparatus as set forth in claim 4, further characterized by the fact that said offtake control means comprises a switch and a switch operating member which is constantly urged to a position to be engaged by an article on said offtake conveyor.

6. Article inverting apparatus comprising in combination, a gravity infeed conveyor, a gravity outfeed conveyor, a cage mounted for vertical translatory movement between said conveyors, power means constantly urging said cage to a position at said infeed conveyor, an article container, rotating means for turnably mounting said container on said cage, the container being open at one end and closed at the opposite end and having top and bottom sides with conveyor elements thereon, turning means for said container which rotates said container on said rotating means during translatory movement and positions it with the open end at the infeed conveyor when the cage is at that end of its travel and turns it during translation with said cage to present its open end to said offtake conveyor when the cage is at that end of its travel, dispensing means for said infeed conveyor which is controlled in part by said container which dispenses an article to said container when it arrives at the infeed conveyor and which holds back succeeding articles when the container moves away from article receiving position, power means for driving said turning means and for translating said cage and turning said container when the cage is translated, control means located in part on said container and in part adjacent said container when in article receiving position which is operated by the infeed of an article to said container to cause said power means to move said cage from the infeed conveyor to said offtake conveyor, control means on said offtake conveyor operated by the passage of an article to cause said power means to return the cage and container to said infeed conveyor, said offtake control means preventing further action of the power means and movement of the cage if an article remains in control actuating position on said offtake conveyor.

7. Apparatus as set forth in claim 6, further characterized by the fact that adjustment means are provided for shifting the position of the closed end of the container to accommodate articles of different diameters and that adjustment means are provided for the part of the infeed position control means which is located on the container to accommodate articles of different diameters.

References Cited by the Examiner
UNITED STATES PATENTS

| | | | |
|---|---|---|---|
| 2,318,180 | 5/1943 | Morse | 198—26 |
| 2,708,943 | 5/1955 | Watson | 134—62 |
| 3,039,588 | 6/1962 | Harnock | 198—26 |

EVON C. BLUNK, *Primary Examiner.*

RICHARD E. AEGERTER, *Examiner.*